Figure 1:
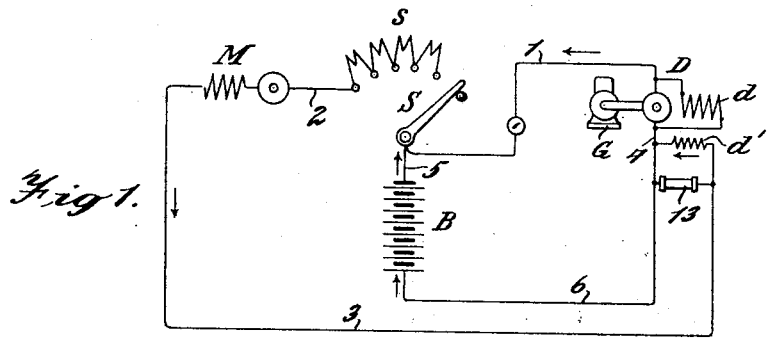

July 21, 1925.

J. B. N. CARDOZA 1,546,618

GAS ELECTRIC TRUCK

Filed July 1, 1920

John B. N. Cardoza INVENTOR.

BY

Rosenbaum Stockbridge & Berst ATTORNEY.

Patented July 21, 1925.

1,546,618

UNITED STATES PATENT OFFICE.

JOHN B. N. CARDOZA, OF VIRGINIA BEACH, VIRGINIA.

GAS ELECTRIC TRUCK.

Application filed July 1, 1920. Serial No. 393,360.

*To all whom it may concern:*

Be it known that I, JOHN B. N. CARDOZA, a citizen of the United States, residing at Virginia Beach, in the county of Princess Anne and State of Virginia, have invented certain new and useful Improvements in Gas Electric Trucks, of which the following is a full, clear, and exact description.

This invention relates to secondary battery power systems and more particularly to such systems when used for propelling electric vehicles. The object of the invention is to provide a system comprehending a mechanically driven generator which is used under the most economical conditions automatically to supply a portion of the power direct to a propelling electric motor and to supply a charging current to the battery, to the end that the radius of operation of the vehicle or the continuous operation of a stationary plant with a battery of a given capacity and under a given initial state of charge may be increased.

A further object is to provide a system in which the mechanically driven generator is capable of operating in parallel with a battery to supply a work circuit, or of charging the battery when the demand for current is light or ceases, without the necessity of manipulating field rheostats, end cells or other regulating apparatus, the inherent construction of the generator itself and its peculiar association with the battery and load circuits, enabling it to automatically shift from one service to another.

Another object of the invention is to provide a gas-electric vehicle in which many of the objectionable features of construction and operation inherent in an exclusively gas driven or an exclusively electrically driven vehicle, are eliminated, while advantages of both systems are retained.

A further object of the invention is to provide a system involving simple and inexpensive machinery, requiring but little care and little skill in its manipulation.

Figure 2:
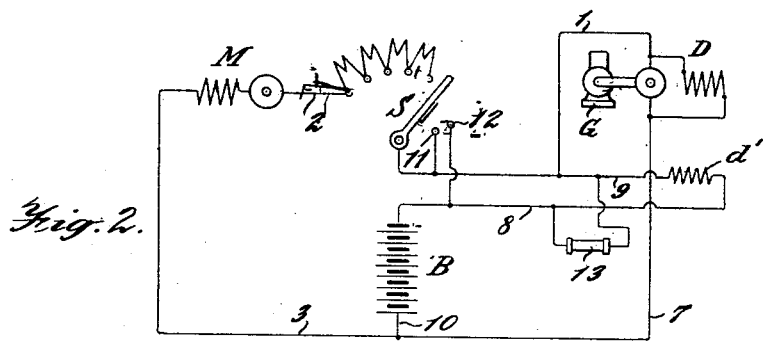
Figure 3:
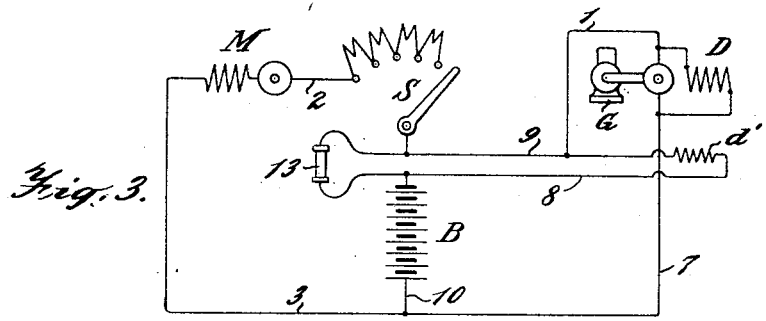

My improved system comprehends an engine driven dynamo, a storage battery, one or more electric motors and a switch for connecting the dynamo and battery in parallel with the motor or motors and by which the speed of the latter is controlled, the connections being such that when the switch is in the "off" position with respect to the motors, the dynamo will remain in circuit with the battery. The particular feature of novelty in my system resides in the use of a shunt wound dynamo having an opposing field magnet coil which is energized by the load current while the motor is active, to maintain the output of the dynamo substantially constant, said opposing field coil, when the motor is inactive, being either deenergized, or energized in a manner to augment the field magnetism, in order to increase the voltage of the dynamo and enable it to charge the battery, all of which will be explained in detail in connection with the accompanying drawing, in which:

Figs. 1, 2 and 3 show conventionally three slightly different arrangements of apparatus and circuits all involving my invention.

My improved system has been designed especially for the propulsion of a truck or other vehicle but it will be understood that its use is not limited to this purpose. Referring to the various figures of the drawing M indicates an electric motor or otner power consuming or translating device and is representative of one or more motors or translating devices whenever it may be desirable to use them for speed regulation by series-parallel control in the usual way. B is a storage battery, D is a dynamo or generator driven by gas engine G and S is a switch by which the system is controlled.

In describing the operation of the system it will be assumed that the motor M is the propelling motor of an electric truck, and that the battery B and generator D with its gas engine G are mounted on the same truck, and that the switch S is manipulated by the driver of the vehicle for the purpose of stopping, starting and varying the speed of the vehicle. I prefer that the dynamo and gas engine shall be of comparatively small capacity or output or such as will enable them alone to propel the vehicle when lightly loaded and running on a level road, the battery on the other hand being capable of supplying any amount of power demanded in the operation of the vehicle in excess of that furnished by the dynamo. The dynamo is an ordinary shunt wound generator whose shunt coil is indicated by $d$. It is further provided with a supplemental field magnet coil $d'$ which may be connected in the circuits in various ways to either oppose the field magnetism of the dynamo or be impotent with respect thereto depending upon whether it is in circuit or not.

This coil may likewise be connected with the circuits of the system in such a manner as that in one instance it may oppose the field magnetism of the generator and in another it may augment the same, as more fully explained hereinafter. But in any case when the coil acts to oppose the field magnetism its effect will be to limit the output of the dynamo, to a given amount, while when it is connected to be either impotent or to augment the field magnetism of the dynamo it will serve to increase the voltage of the machine. It is the intention to drive the dynamo D continuously by means of the gas engine G while the truck is in use or so long as the battery is not fully charged, the function of the dynamo being not only to supply a portion of the current drawn by the motor in propelling the vehicle but also to direct a charging current through the battery at all times and on all occasions during the day or any ordinary period of operation when the motor is out of circuit as for instance when the truck is loading or unloading or temporarily stalled from any cause, or demand from motor is light. The circuits will be described in connection with the operation, which is as follows; with reference to Fig. 1. The switch S is shown in the "off" position. To start the vehicle the switch is thrown to the left to close the circuit and gradually cut out the resistance. The circuit thus closed connects the dynamo D with the motor M as follows: from dynamo by wire 1, switch S, wire 2, motor M, wire 3, supplemental coil $d'$ and wire 4 to the generator, thus putting the coil $d'$ in circuit with the motor M, the direction of current in the coil being such as to induce a magnetic flux in the field of the dynamo which opposes the flux induced by the shunt coil $d$. The extent of this opposing flux is predetermined to be such as to permit the generator to deliver sufficient current to the motor M to propel it over level roads or when lightly loaded. The closing of switch S also establishes another circuit as follows: from battery B, by wire 5, switch S, wire 2, motor M, wire 3, coil $d'$ and wire 6 to battery. This circuit connects the battery and the dynamo in parallel with the motor, the battery thereby having a "floating" connection which enables it to supply current to the motor whenever the demand is above that which the dynamo is intended to supply. Under this running condition the voltage of the generator is substantially equal to or slightly below that of the battery at which point it is practically maintained, as before stated, by the action of the reverse field coil $d'$. When the motor demands more current than this normal amount by reason of a grade or increase in load, the necessary excess of current is supplied by the battery and on these occasions since the excess current traverses the coil $d'$ the voltage characteristic of the dynamo will substantially follow that of the battery and the dynamo will continue to supply its normal or constant horsepower. Whenever the motor is cut out of circuit to stop the vehicle or for other reason, by the opening of the switch S the coil $d'$ is at the same time cut out of circuit, as can readily be seen and the battery is at the same time thrown on to a closed circuit with the dynamo through the connections 1, 5, 6 and 4. The dynamo then operates as an ordinary shunt machine, and since its field magnetism is not affected by the opposing coil $d'$, its voltage immediately rises sufficiently to overcome the voltage of battery B so that the battery will receive a charging current. This condition continues as long as the switch is open and the extent to which the battery is charged during the day or other period of operation will depend upon the portion of the entire period that the battery is on charge. It has been determined that in an ordinary working day an electric truck is actually running only about two fifths of the time so that with this system the battery will be undergoing charge for three fifths of the working period. It will thus be seen that with a battery fully charged at the beginning of the day the radius of operation of the truck during the ten hours can be considerably increased by thus charging the battery during three-fifths of the period. It will also be seen that since the effect of utilizing a charging outfit during periods of idleness of the truck is the equivalent of increasing the ampere capacity of the battery, that the size of the battery may be materially reduced.

An important advantage of this system is that while it involves the use of a gas engine, such use is not accompanied by the usual objections to a gas engine. Since the engine runs continuously at practically constant speed and constant load it requires no attention on the part of the driver to maintain it in operation, and what is perhaps of more importance, the fuel consumption of a constant speed, constant load gas engine is considerably less than that of the ordinary variable speed engine. A constant load engine also facilitates the use of engines using fuel oil and engines of the Diesel type which is of considerable advantage. The voltage of the dynamo automatically increases or decreases as it is shifted from the charging to the running condition and vice versa, the driver is not required to manipulate any regulating device or to take any action to vary the electro-motive force of the battery, or to concern himself in any degree with the machinery except to operate the usual starting, stopping and speed controlling switch S.

In Fig. 1 to which the above description refers, the opposing coil $d'$ is connected in series with the motor and also in series with the battery and dynamo when the motor is taking current. In Fig. 2 the coil $d'$ is in series with the motor and battery only when the motor is taking current, the resulting effect being substantially the same. In Fig. 2 when the switch S is closed the circuit of the dynamo is as follows: to wire 1, switch S, wire 2, motor M, wire 3 and wire 7 to dynamo. At the same time the circuit of the battery is by wire 8 through coil $d'$, wire 9, wire 1, switch S, motor M, wire 3 and wire 10, the battery thus being in parallel with the dynamo and the coil $d'$ in series with the battery and the motor. The coil $d'$ will act as an opposing coil as before to maintain the voltage of the dynamo constant. When the vehicle is stopped or the motor cut out the switch S in moving to its "off" position bridges the two terminals 11 and 12 which short circuits the coil $d'$ permitting the electro motive force of the dynamo to build up to charge the battery over the following circuit: wire 1, contacts 11 and 12, wire 8, battery B, wire 10 and wire 7. While the effect of this arrangement may be prearranged to be substantially the same as the effect produced in the system of Fig. 1, it is pointed out that such slight current as may flow through the coil $d'$ will be in a direction contrary to that in which the current of the battery flows when discharging so that the magnetic effect of the coil $d'$ is to augment that of the shunt coil rather than to oppose it. This effect however will be negligible since the short circuit at 11—12 will be practically complete but can be adjusted to suit conditions.

In Fig. 3 a further modification is shown in which substantially the same result is obtained by a slightly different connection of the coil $d'$. In this case in the running condition the circuit of the dynamo is by wire 1, switch S, wire 2, motor M, wire 3 and wire 7 while the circuit of the battery is by wire 8, coil $d'$, wire 9, switch S, motor M, wire 3 and wire 10, the coil being in series with the battery and motor and limiting the output of the dynamo. Under the charging condition with the switch S open the circuit of the dynamo is by wire 1, wire 9, coil $d'$, wire 8, battery B, wire 10 and wire 7. Under this condition the current flows through the coil $d'$ in the direction opposite to that in which it flows under the running condition, consequently the magnetic effect of the coil $d'$ augments instead of opposes that of the shunt coil of the dynamo and the voltage is consequently increased to charge the battery.

In all these instances. it will be seen that by reason of the inherent construction of the dynamo, and the peculiar association of the circuits of the coils on the field magnet of the dynamo with the load and battery circuits the shift from one voltage to another is automatically effected and the voltage characteristic of the generator will always correspond to that of the battery and will rise and fall in accordance with changes in load so that the power delivered by the generator in running will not exceed its predetermined maximum and under practical conditions will be substantially constant.

There is shown at 13 a resistance shunting coil which may or may not be required to predetermine the amount of current traversing the coil $d'$.

I claim:

1. The combination of a shunt wound generator having a supplemental field magnet coil, a storage battery, a power consuming device and a switch, the switch having positions whereby the generator and battery are either connected in parallel with the power device, or the generator and battery are connected in series and both disconnected from the power device, while the connections of the supplemental field magnet coil are in the first instance such that the voltage characteristic of the generator will be determined by the load and in the second instance such as to increase the electro motive force of the generator.

2. The combination of a shunt wound generator having a supplemental field magnet coil, a storage battery, a power consuming device and a switch, the switch having a position in which the power consuming device, the battery and the supplemental field magnet coil are connnected in series while the generator is connected in parallel with the battery and power consuming device, and another position in which the generator, the battery and the field coil are connected in series and the generator and battery are disconnected from the power consuming device.

In witness whereof, I hereunto subscribe my signature.

JOHN B. N. CARDOZA.